United States Patent [19]

Von Kohorn et al.

[11] Patent Number: 4,672,513
[45] Date of Patent: Jun. 9, 1987

[54] ILLUMINATING SYSTEM FOR THREE-DIMENSIONAL OBJECTS

[76] Inventors: Henry Von Kohorn, 215 Rocky Rapids Rd., Stamford, Conn. 06903; David Von Kohorn, 1926 Menalto Ave., Menlo Park, Calif. 94025

[21] Appl. No.: 869,136

[22] Filed: May 30, 1986

Related U.S. Application Data

[62] Division of Ser. No. 660,906, Oct. 15, 1984, Pat. No. 4,630,177.

[51] Int. Cl.[4] .............................................. F21V 7/04
[52] U.S. Cl. ...................................... 362/32; 362/805
[58] Field of Search ............... 362/805, 806, 122, 123, 362/32

[56] References Cited

U.S. PATENT DOCUMENTS

| | | | |
|---|---|---|---|
| 2,016,794 | 10/1935 | Bade et al. | 362/122 |
| 2,432,632 | 12/1947 | Seibel | 362/122 |
| 2,723,341 | 11/1955 | Greenspan | 362/101 |

Primary Examiner—E. Rollins Cross
Attorney, Agent, or Firm—Parmelee, Bollinger & Bramblett

[57] ABSTRACT

Three dimensional objects such as plants, are illuminated with indirect, substantially glare-free, directional lighting. Artificial light is generated at a central point which is recessed in close proximity to and below the objects to be illuminated. The light enters light-conductors through an optical interface and is conducted towards and projected in the direction of the interior of the foliage of plants or of other objects. The light is reflected from such objects thereby creating substantially glare-free viewing from any position around the illuminated object.

18 Claims, 8 Drawing Figures

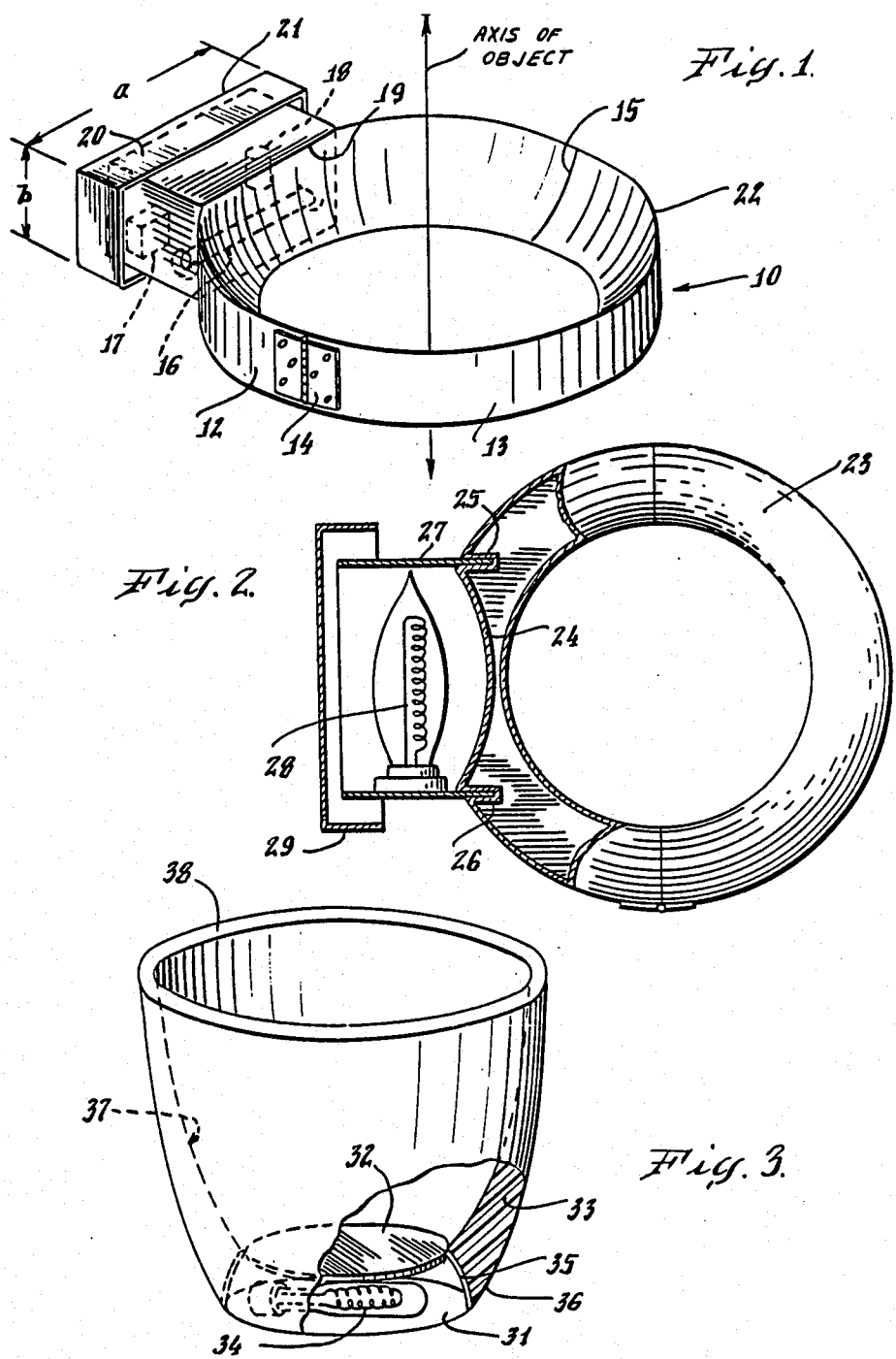

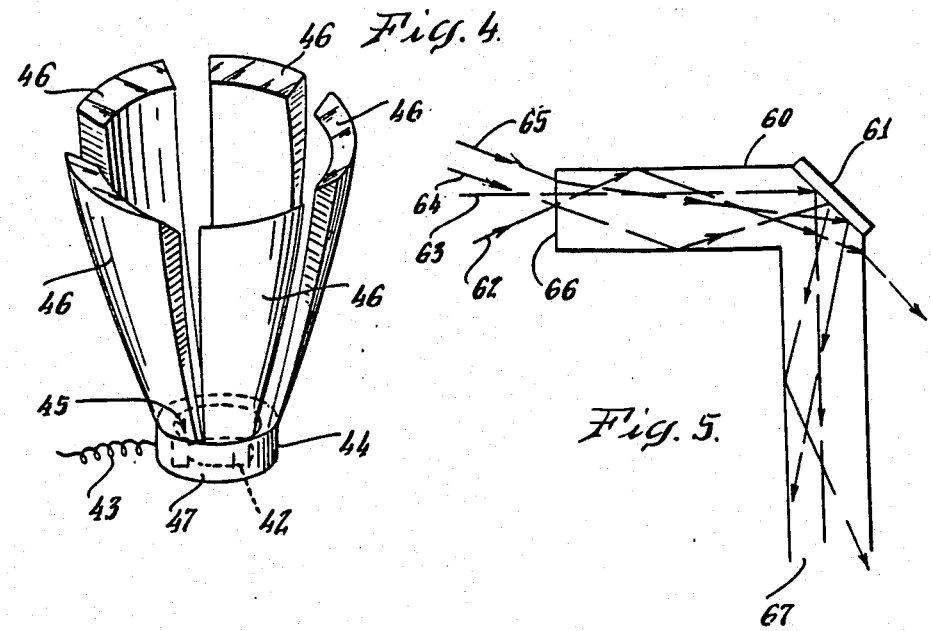
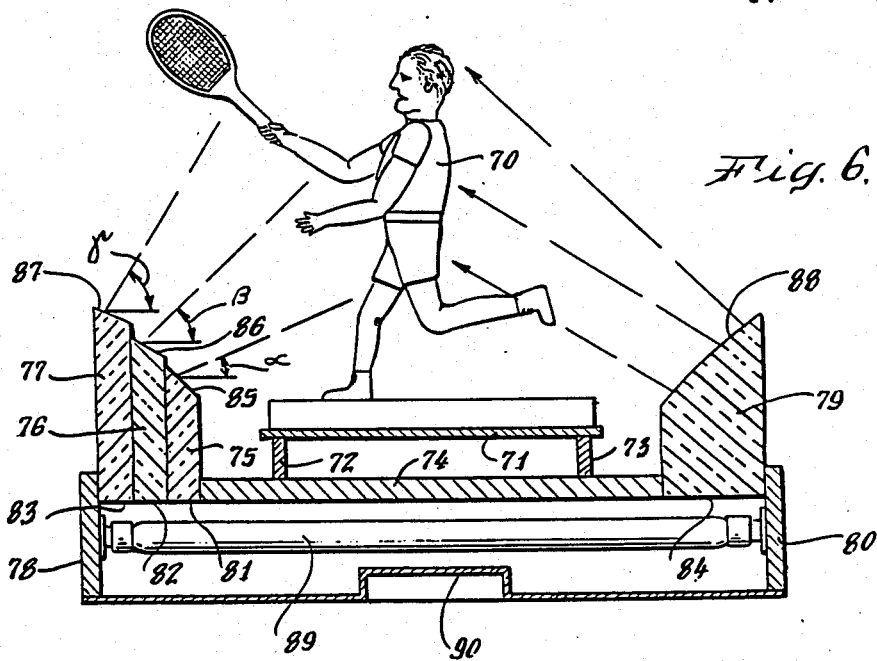

ILLUMINATING SYSTEM FOR THREE-DIMENSIONAL OBJECTS

This is a divisional of copending application Ser. No. 660,906 filed on Oct. 15, 1984; now U.S. Pat. No. 4,630,177.

BACKGROUND OF THE INVENTION

The present invention relates to the directional lighting of objects having three-dimensional surfaces, such as plants, sculptures and other defined or free-standing objects, rather than two-dimensional areas.

It particularly relates to the substantially glare-free illumination of objects intended to be centripetally viewed by a plurality of observers grouped around such lighted object.

Conventional methods used to light three-dimensional objects involve the use of spotlights, ceiling lights, track lights and the like, normally beamed at and around the object to be illuminated from a distance, normally of several meters. Such lighting methods and devices have a number of disadvantages. A primary disadvantage stems from the distance at which conventional lights are mounted from the object to the illuminated. This causes not only loss of lumens, but a scattering of light beyond the confines of the object. It is obvious that, the greater the distance, the more difficult it is to economically direct light with precision at three-dimensional objects, especially objects having irregular configurations. An illustration would be a tall or spindly plant or an irregularly shaped object, in the lighting of which much of the light passes by and through such an object.

A serious drawback of such lighting methods lies in the glare produced by ceiling lights and spotlights, which results in discomfort to the eyes of observers.

Glare-free lighting devices positioned in close proximity to the objects to be illuminated are known and employed in the conventional lighting of two-dimensional surfaces such as paintings, murals, wall hangings and the like. Such devices, mounted for instance at the top or bottom edge of a painting are, however, not suitable for lighting objects having three-dimensional surfaces, such as standing or hanging indoor or outdoor plants, in a decorative, pleasing and effective manner. The present invention therefore is specifically directed towards the illumination of objects having three-dimensional surfaces and does not relate to the lighting of two-dimensional, planar, or essentially flat areas, such as floors and walls, or other flat objects such as paintings and tapestries.

Directional lighting devices, such as spotlights, are used extensively in the illumination of specific three-dimensional objects. The light from such light sources, illuminating for instance the foliage of plants, normally emanates from one source or from several discrete light sources placed at a distance from the object. The disadvantages of these devices, including those that are recessed, are several. First, the light originating at a single source or even at several sources, positioned at a distance and directed at a plant, illuminates only that facet of the foliage which faces such light sources, i.e., one side of the plant. Also, such light usually shines across and through the plant, which is inefficient. More importantly, the naked light shines directly into the eyes of persons facing the light source. If the illuminated plant is thick or dense enough to prevent light from shining through it in such annoying fashion, it follows that the side of the plant facing away from the light source receives no illumination at all. If, in order to overcome these drawbacks, several light sources are disposed around the object to be illuminated, the equipment cost and operating expenses expenses are correspondingly multiplied. Furthermore, juxtapositioned persons will suffer discomfort, because, using currently available devices, the pleasing effect of lighting the foliage of plants and shrubs is destroyed when the human eye is directly exposed to the light source. For these reasons, conventional lighting devices are particularly unsatisfactory when objects are displayed for viewing from all sides, e.g., free-standing museum exhibits, theatrical and public displays.

The type of outdoor lighting device commonly used, which has reflectors close to the ground directing light downwardly in a glare-free manner, is capable of illuminating only flowers or short plants; whereas the present invention does not depend on the height, shape or level of the object to be illuminated.

The present invention therefore is intended to be useful in lighting three-dimensional objects involving multi-directional and centripetal (radially inward) viewing by observers on different, or even opposite, sides of the object to be illuminated, irrespective of whether the lighted object is transparent, has openings or is irregularly shaped.

The invention overcomes the other problems mentioned and, in addition, achieves a number of objectives not attained by conventional devices.

The components used in combination as described hereinafter are relatively few and simple to manufacture and assemble. As a result, they are economical with respect to both capital and operating costs.

It therefore is a principal object of the present invention to directionally illuminate three-dimensional objects, such as plants and sculptures, in such a manner that the source of light is not directly visible and glare is substantially avoided.

It is another object to minimize the loss and consumption of lumens by placing the light source in close proximity to the object to be illuminated, so as to shorten to the practical minimum the indirect path the light has to travel in illuminating the object.

It is still another object of the invention to avoid the scattering of light inherent in other indirect lighting methods.

It is yet another object to provide an illuminating system and luminaire which are economical and simple to manufacture, install and maintain and which are highly efficient in operation.

It is still another object to indirectly light three-dimensional objects in a novel, decorative and pleasing manner.

The various objects and advantages of the invention will become apparent from the following description and accompanying drawings. While the description and drawings are for illustrative purposes primarily directed to plants and sculptures, it will be appreciated that the devices and methods claimed are equally suitable for and applicable in the illumination of other objects, such as antiques, art objects, mineral exhibits, theatrical devices, stage props, museum and show pieces of any nature.

SUMMARY OF THE INVENTION

The present invention may be summarized as being directed to devices and methods for the indirect, substantially glare-free, directional lighting of three-dimensional objects, by which artificial light is generated at a recessed, central point in close proximity to the object to be illuminated. Said light enters light-conductive means such as fabricated or molded acrylic structures, through an optical interface and is conducted by appropriately shaped conductive members towards the object to be illuminated. Light is emitted from and projected by said conductive members in the direction of such object without significant scattering of light. Shielding means protect the eyes of observers from direct view of the light source. The light is centripetally and indirectly visible primarily by its reflections from the illuminated object. The novel arrangement of components according to the present invention thus permits multi-directional, centripetal viewing, including particularly the substantially glare-free viewing, by a plurality of observers, including persons grouped around the illuminated object in a circle.

Glare is absent in the illumination of objects according to the present invention, because viewers of an object are not positioned between the light source and the object, nor are they positioned opposite the light source, as is often the case with spotlights and ceiling lights.

The lighting method and devices of the present invention drastically reduce electric power requirements by reducing the distance between the light source and the objects to be illuminated to the practical minimum. Except for such support means for the object to be illuminated, such as a flower pot, the light source is proximate to said object and this novel arrangement reduces the light path in virtually all instances to substantially less than one meter. In most cases, the light will travel less than 20–50 centimeters to reach the object. Despite the short light path, virtually no heat given off by the light source is transmitted to plants or other heat-sensitive objects by the conductive member, which member may also be adapted to filter out undesirable ultraviolet light. The light source nevertheless provides light of predetermined and sufficient intensity through light conductive members without the use of reflectors, so as to illuminate designated surfaces of objects in an effective and decorative manner.

Light conductive means and light outlets are generally disposed around and terminate in close proximity to the individual surfaces of the object to be illuminated. Said outlets focus light on said object in a centripetal manner without substantial scattering and resulting loss of light, thereby offsetting undesirable highlights and shadows and, when required, producing more even lighting of objects having three-dimensional surfaces. However, individual surfaces of the same object to be viewed in relief can also be lighted with or involving different amounts, colors, concentrations, configurations, distances and angles of light emitted by conductive member terminating within a distance of a few centimeters from the object. Highly economical manufacturing and maintenance costs result from the fact that the devices claimed comprise relatively few and simple components. Low operating costs result from the fact that both the light source and light outlets are positioned a short distance from the object to be illuminated, permitting the use of lower wattage lamps.

DEFINITIONS

As stated, the avoidance of the glare associated with tracklights and spotlights is a primary object and result of the devices and methods described herein. The Encyclopedia Britannica published in 1956 defines glare as follows:

"When brightness becomes irritating it is recognized as "glare." Glare contributes more to the poor quality of a lighting system than any other factor. Glare may depend upon several conditions present in the lighting system: (1) high brightness of the source; (2) high brightness contrast between the source and the background; (3) location of the source in the field of view; (4) the total volume of the light entering the eye; and (5) the time of exposure to the brightness source. The correction of any one of these contributing factors becomes simple when it is considered individually. Because of the injurious effect of glare, either direct as from a source, or reflected from some object which reflects a specular image, bare lamps exposed in any plane should never be used. It is of prime importance that all forms of glare be controlled properly."

The term "source of light" as used herein is intended to include where appropriate a combination of more than one lamp positioned at a lighting hub or arranged in such manner as to function as a central light source. The term "object" in the phrase "object to be illuminated" is intended to include, where appropriate, the holder or support for sculptures, or associated elements of such objects as for instance the flower pot of a plant. The term "conductive" as used hereinafter is defined as "light-conductive." When referring to light-conductive materials, all substances capable of transmitting or piping light, for instance glass, acrylic and polystyrene plastics, are intended to be included. The light-conductive members frequently consist of solid, i.e., not hollow, structures; such members may, however, also be hollow, as for instance in the shape of tubes, provided that the thickness of the walls of these tubes is such that there is sufficient light-conductive mass to transmit the light.

As used herein, the term "optical interface" is intended to describe a clear transparent surface of a light-conductive body, through which light is emitted or received. Such surface may be in contact with air or with the optical interface of another light-conductive body. The term "directional lighting" as used herein is intended to refer to the projection of light essentially in the direction of predetermined surface areas of three-dimensional objects with a minimum of light dispersion outside said areas.

BRIEF DESCRIPTION OF THE DRAWINGS

FIG. 1 is a diagrammatic view in perspective of the illuminating device.

FIG. 2 is a diagrammatic cross-sectional top plan view of another embodiment of the device.

FIG. 3 is a partially broken away diagrammatic view in perspective of another version of the device.

FIG. 4 is a diagrammatic view in perspective of yet another embodiment of the device.

FIG. 5 is a schematic diagram of light transmission through a light-conductive member having a ring angle bend.

FIG. 6 diagrammatically illustrates a number of alternative configurations of the conductive member employed in lighting multi-faceted objects by means of a central light source disposed in close proximity to such object.

DETAILED DESCRIPTION OF THE INVENTION

Figure 7:
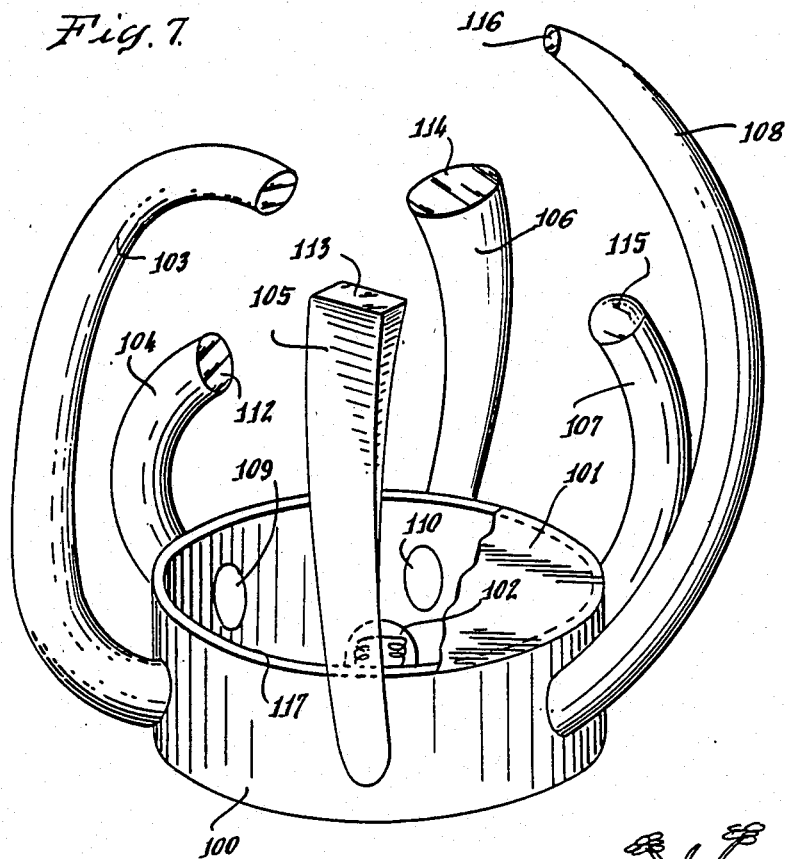
FIG. 7 is a partially broken away diagrammatic illustration of a number of other possible embodiments of the light-conductive members of the device.

The principles of the present invention are applicable to a wide variety of devices achieving the objects mentioned. A number of these embodiments are set forth in the description of the drawings that follow.

While the examples given in this specification are illustrative of lighting plants and sculptures, it should be understood that appropriately modified devices of the nature claimed may be utilized in the directional illumination of any other three-dimensional objects and in particular those to be centripetally viewed.

The light-conductive means chosen for illustrative purposes comprise acrylic plastic, but any other light-conductive materials may be employed in practicing the invention.

Acrylic plastic structures conduct light well within clear, transparent walls of the members of such structures. Loss in light transmission incurred in piping light through an acrylic structure having clear walls does not exceed ten percent. However, if such walls are roughened, light will tend to dissipate through such disturbed surfaces. Randomly frosted, sand blasted and scratched surfaces, or systematically engraved and debossed surfaces will cause light rays to scatter randomly or in patterns corresponding to such engravings, etc. Surfaces of members conducting light may be roughened for the purpose of providing illumination of ambient space or for decorative purposes. Sometimes the emission of light through surfaces of the side walls of light transmitting members is desired in addition to that projected at the light emitting edge of members. Such light emission is produced by roughening selected surfaces by sanding or other means.

Acrylic plastic materials can easily be fabricated, molded, cast and formed from blocks, sheets, rod and tubing. The piping of light through bent tubing is intended to be included within the scope of the present invention, the light being introduced into the void inside of such tubing, emerging at its other end.

Acrylic plastics are characterized by excellent machinability as well as by high resistance to chemicals and weather conditions. They are obtainable in colors, opaque, translucent and transparent, all of which specifications may be used to advantage in practicing the present invention and obtaining highly decorative and pleasing effects. Acrylic bodies may be joined by softening the acrylic surfaces with a solvent, such as methyl chloride, and pressing them together to form a hard joint, particularly where an angle or bend is required. Such joints can serve as optical interfaces.

Some commercially available acrylic plastics are formulated to absorb ultraviolet radiation in the range below 400 nanometers, and ultraviolet light emission from fluorescent lamps can be reduced as much as 90 percent. Such material is employed in the device described to reduce photochemical damage caused by ultraviolet radiation. This property may be also used to advantage in controlling the development and growth of plants through illumination of plants by the claimed devices; for instance, the flowering cycle of certain plants may be controlled by regulating the emission of ultraviolet light. Light low in ultraviolet content may also be used advantageously in the long term lighting of free-standing art objects, antiques and documents of a sensitive nature.

The devices claimed are particularly suitable for use in applications where the objects are heat sensitive, such as antiques. Virtually no heat is transmitted by the light-conductive members. Because fluorescent lamps give off little heat, very little distance is required between the lamp, the light-conductive member and the object in practicing the present invention.

The illuminating device depicted in FIG. 1 comprises as its two principal sub-assemblies light ring 10 and light chamber 21. As set forth in detail, artificial light generated in chamber 21 is transmitted to light ring 10 from where it is projected in the direction of the object to be illuminated. Light ring 10 consists of a light-conductive material, in this instance molded acrylic plastic, capable of transmitting light through its mass. It has an annular shape, but may be manufactured in different configurations, provided it substantially encircles the object (not shown) to be illuminated. As an example, the device may rest on the rim of or in a flower pot or planter, or it may encircle the base of a sculpture and the like.

In the case of the latter embodiment illustrated in FIG. 1, sections 12 and 13 are connected by hinge 14. Section 13 may thus be rotated around hinge 14, so that the device may be placed around a horizontally protruding object such as a plant positioned in a relatively wide flower pot having foliage spreading outwardly beyond the confines of light ring 10. Light ring 10 may be closed by swinging section 13 around hinge 14 causing the two light-conducting sections 12 and 13 to make optical contact where they are separably connected by hinge 14 and at the second contact area, i.e., optical interface 15. Sections 12 and 13 may be brought into optical contact with each other at interface 15 by means of clamps, hooks or other suitable fastening or tightening devices.

To permit placing light ring 10 around said objects, it may also be molded or otherwise fabricated with a large enough inside dimension to fit around the widest protrusions of the three-dimensional object to be accommodated when sliding the device into place around the object from above or below; alternatively, light ring 10 may be divided into two or more separably coupled sections. In the device of FIG. 1, the light emanating from light chamber 21, first enters section 12 from where it is transmitted to section 13.

Devices having such separably connected sections can, for instance, be placed on the soil in a wide-rimmed flower pot around the stem of a very bushy plant, where both the flower pot and plant foliage have diameters larger than that of the light ring 10.

Sections 12 and 13 may be molded or otherwise manufactured in separate pieces, or they may be made in one piece and divided by cutting in a radial plane or at an angle thereto. The optimum angle and configuration of these optical interfaces depends on the refraction angle of the light conductive material used and the direction or directions in which the light is to be projected from light ring 10. According to one embodiment of the invention, the two sections 12 and 13 terminate in male and female configurations respectively. If the two light-emitting ends of section 12 are convex-shaped and the two light-receiving ends of section 13 are correspondingly concave-shaped, good llight interception by section 13 will result. If the two light-emitting ends of section 12 are concave-shaped and the two light-receiving ends of section 13 are convex-shaped, a collimating effect is achieved, i.e., the light rays entering section 13 will be deflected into more parallel directions.

Light ring 10, or sections 12 and 13, or one of them, can have a variety of cross-sectional profiles, depending on the direction and dispersion of the light to be projected in the direction of the object to the illuminated. The light-emitting surface 22 of light ring 10, or of sections 12 and 13, or of one of them, may be configured so as to project an upwardly converging light band of substantially parallel light rays enveloping a somewhat cone-shaped object; or it may be configured so as to project a cone-shaped light mantle, the wall of which narrows towards the upper extremity of the object. The light rays issuing from such light-emitting surface also may be made to diverge if a larger surface of the object is to be covered by the illumination. The light-emitting surface may therefore range from convex to flat to concave, depending on the effect to be achieved. Furthermore, sections 12 and 13 may have different cross-sectional profiles, or may be subdivided into subsections having different profiles. This is particularly useful in the case of objects, such as sculptures, where different parts or surfaces call for different amounts, angles and concentrations of light.

According to a preferred embodiment, light ring 10 has a width at its bottom of 15-25 millimeters, a height of 20-30 millimeters, and is tapered towards the light-emitting surface, which has a concave configuration facing the object. Excellent light conductivity is obtained if the surfaces of ring 10 are clear, smooth and transparent. Alternatively, some or all surfaces of ring 10, except for optical interface 19 and light emitting surface 22 may be covered with a light-reflective substance, such as white or metallic paint. Said paint, or other reflective material reflects light back into ring 10. Said reflective layer may, in turn, be covered on its outward facing surface by a dark-colored, non-reflective layer serving as shielding means to minimize glare and discomfort to the eyes of observers.

In the device illustrated in FIG. 1, the cross-sectional profile of sections 12 and 13 is concave. The concave surface faces in the direction of the object (not shown) intended to be encircled at its base by light ring 10 for centripetal viewing. As can readily be appreciated, observers grouped around such object are exposed to virtually no glare, as the light is thrown inwardly from light emitting surface 22, striking essentially only the surfaces of the target object.

In the case of the embodiment shown in FIG. 1, wherein the light-emitting surface 22 is concave, the outer wall of light ring 10 can serve as a light shielding means. This shielding effect can be augmented by providing a light-impermeable collar around and protruding above the upper rim of light ring 10.

Light is generated in light chamber 21 by appropriately connected components, in this instance fluorescent lamp 16, ballast 17 and starter 18, all of which are indicated in dotted lines. Light chamber 21 containing these components consists of a light-impermeable housing having two open sides. One open side faces and is attached to optical interface 19; the other open side faces in the opposite direction. In the device illustrated in FIG. 1, said interface 19 is flat and has been created by slicing a segment from the outside of section 12. Optical interface 19 may also be concave, if maximum light interception is desired, or may be convex, if the light rays are to be collimated. Clear or colored transparent walls or filters may be provided in the open side of chamber 11 facing ring 10.

The light generated in chamber 21 is prevented from being directly visible by provided shielding means or cover 20. In the device illustrated in FIG. 1, cover 20 consists of an open, rectangular, light-impermeable box having ample depth, so as to fit around chamber 21 without its outer wall 21 touching chamber 21. The dimension of cover 20 indicated by (b) is such as to provide a snug fit of cover 20 on two sides of chamber 21, serving as a form of clamping device to hold cover 20 in place, while creating a spaced relationship between wall 21 and chamber 21. Any other clamping or fastening devices may, of course, be employed. As shown in FIG. 1, the dimension of cover 20 indicated by (a) is such as to create a spaced relationship between the walls of chamber 21 and the two other sides of cover 20. The described spacing creates paths for the introduction and circulation of air in chamber 11 and cover 20. While little heat is given off by fluorescent lamps, other lamps generate considerable amounts of heat which is removed through thermal currents through said spacings, or through ventilation by conventional means.

FIG. 2 is a top plan diagrammatic view of a device comprising molded light ring 23 having concave optical interface 24 and slots 25 and 26, which accommodate the rims and part of the walls on two sides of housing 27. Slots 25 and 26 are adapted to fit snugly on the parts of wall 27 extending into said slots, thus obviating other means of mechanical fastening or cementing. Light source 28, shown as an incandescent lamp, is mounted in housing 27, which is open on the side facing ring 23 and on the opposite side. The light-emitting surface of ring 23 is flat and faces upwardly at a 45 degree angle. The light generated by light source 28 is prevented from being directly visible by cover 29, which is of the kind shown in FIG. 1. The device diagrammed in FIG. 2, which has only one optical interface 24 molded in light ring 23, and which requires no fastening means or cementing of parts, results in very low production costs. The described lighting arrangement comprising only one light source permits observers groups around the illuminated object to view the object without discomfort in a centripetal direction, i.e., radially inwardly. If so desired, the distribution of light directed at and enveloping the object to be illuminated, can produce a much more uniform lighting effect than can discrete spotlights, in which event the device ensures uniform and glare-free views of the lighted object by all observers grouped around it. This method is in contrast to conventional techniques where some observers always always face the light source.

FIG. 3 is a partially broken away, diagrammatic perspective view of a version of the device molded from acrylic plastic. The device has an upper cavity 30 providing space for the object to be illuminated and a lower cavity 31 serving as a light plenum chamber. Cavities 30 and 31 are separated by wall or partition 32 which normally does not transmit light. It preferably is adapted to reflect light downwardly. Member 33 surrounds both cavities and is light-conductive. Its upper edge 38 has a surface facing the object to be illuminated and may be straight or rounded, depending on the surfaces of the object to be lighted.

Cavity 31 is adapted to contain an artificial light source 34, which may be incandescent or fluorescent. Air may be circulated through cavity 31 through appropriate openings. The outer surface 36 of lower cavity 31 containing light source 34, a portion of the outer surface of wall member 33, or all of the outer surface of wall 33 are covered by a light-impervious substance. Such covering may include paint or metallic layers reflecting light inwardly. The inner surface 37 of wall member 33 facing upper cavity 30 may also be adapted to reflect light back towards the inside of wall member 33. The lower cavity serving as light plenum chamber 31 either is provided with a bottom closure or rests on a supporting surface preventing light from escaping downwardly.

Light generated by light source 34 can escape or issue from light plenum chamber 31 only through the optical interface 35 in the lower portion of wall member 33 surrounding cavity 31. The surface of optical interface 35 in chamber 31 may be annular and concave as shown in FIG. 3, or may have another configuration. The light generated travels upwardly through wall 33 and issues through light-emitting edge 38 in the direction of the object to be illuminated. The base or support for said object, such as a flower pot, may rest directly on partition 32 or the object may be otherwise supported and raised so as to protrude at least partially above upper edge 38.

When the device described is used in places where it would be impractical or ungainly to conduct electric cables, battery-powered light sources may be substituted for those supplied from a public utility.

FIG. 4 is a perspective view of the illuminating device comprising a light plenum chamber 47 containing light source 42 connected by wire 43 to a battery or commercial power supply source (not shown). If an incandescent lamp is used, air vents are provided in chamber 47. Side wall 44 of chamber 47 is adapted to serve as a light shield, preventing light from escaping. A bottom closure, or the surface on which the device rests prevents light from escaping downwardly.

According to the embodiment of the device shown in FIG. 4, the upper wall 45 of the chamber 47 has an optical interface with the lower edge of light conductive members 46, all of which members are identical and disposed around the space in which the object to be illuminated (not shown) is positioned. Members 46 are made of acrylic plastic and are wedge-shaped, as well as curved. Their upper, light emitting edges are either concave, convex or flat and face the object. They may be roughened to aid light emission. Some or all of the surfaces of wall members 46, except their light-emitting edges, are provided with a light-impervious coating and may for instance be covered or painted with a substance reflecting light inwardly into said members 46. Alternatively, translucent patterns may be provided on the outside surfaces of said members for decorative purposes. The object to be lighted normally protrudes above the upper light emitting edges of members 46, which edges direct the light primarily inwardly and upwardly. It will be appreciated that the light-conductive members of devices incorporating the principles of the invention may be given a large variety of configurations.

Light-conductive members may, for instance, be bent or curved as much as 90 degrees or more. If, for instance, a right angle is to be incorporated into the light-conductive members of a device, a number of conventional light piping techniques can be employed, one of them being described below.

FIG. 5 is a diagrammatic view of an acrylic conductive member 60, such as may be employed in the piping of light by the devices described herein, said member having an elbow or 90 degree bend. Without the technique described below, a significant amount of light would be lost at the point of such a sharp angle, the light rays escaping from the conductive member when their angle of incidence exceeds the critical angle of the material, in this instance acrylic plastic.

In order to avoid such loss of light through surfaces of the solid member, the outside corner has been cut off, so as to create surface 61 in a plane at a 45 degree angle to both arms of member 60. The outside of surface 61 is covered or coated with a substance reflecting light rays back into member 60. Such reflective material may be applied by painting, metallizing or other means.

Light rays 62, 63, 64 and 65 enter member 60 at light-receiving edge 66 and are conducted or reflected around said bend by the reflective surface 61 with minimal loss.

In an alternative embodiment, a bezel of the type known in the art is provided on the outside of first conductive member from which a corner has been cut off. The bezel causes the light rays from said first member to be reflected into a second conductive member positioned at a right angle to the first member.

The above described techniques may be incorporated into the devices claimed whenever sharp bends in the light-conductive members are required.

FIG. 6 is a diagrammatic cross-sectional illustration of an embodiment of the claimed device intended to light three-dimensional, multi-faceted objects, such as sculpture 70 and the like, having features and surfaces requiring individual light treatment for optimal effect.

In the rectangular configuration of the embodiment of the device shown, sculpture 70 rests on support 71 mounted at the desired height on legs 72 and 73 or on other conventional positioning means. Legs 72 and 73 shown are two of four adjustable legs resting on horizontal, light-impervious wall or partition 74. Partition 74, at its vertical outer edges, is adhered to vertical light-conductive members 75, 76 and 77, which are adhered to each other, as well as to outer vertical member 78. One or more of the four walls of the illustrated embodiment may consist of several such light-conductive members.

Partition 74 is also adhered to vertical, light-conductive member 79, which is adhered to outer vertical member 80. Vertical members 78 and 80 are light impervious. One or more light conductive members may have the configuration of member 79, depending on the lighting effect to be created. Vertical, light-conductive members 75, 76 and 77 have lower light-receiving surfaces or edges 81, 82 and 83 respectively. Vertical light conductive member 79 has lower light-receiving surface or edge 84. Members 75, 76 and 77 have upper light-emitting surfaces or edges, 85, 86 and 87 respectively, said surfaces forming different angles to the horizontal.

According to the example of FIG. 6, surface 85 forms angle alpha, surface 86 forms angle beta and surface 87 forms angle gamma; said angles being 30, 40 and 50 degrees to the horizontal respectively. Member 79 has a curved, upper light-emitting surface or edge 88.

Outer vertical members 78 and 80 shown are two of four members forming a housing around the different vertical light-conductive members surrounding sculpture 70. The vertical members forming said housing, are light-impervioius and are adapted to accommodate between them the light source, in this instance fluorescent lamp 89, and other needed components, such as an accompanying starter and ballast (not shown). If air circulation is desired, a number of cut-outs or vents 90 are provided. Light is prevented from being directly visible through said cutouts by placing the device in an open box (not shown), open at the top and having light-impervious walls high enough to mask said cut-outs 90.

By providing vertical, light-conductive members 75, 76, 77 and 79 with upper surfaces having different light-emitting angles, light rays are directed towards the sculpture along the various directions of the arrows shown. In this manner, predetermined areas or surfaces of sculpture 70 may be emphasized through individual lighting treatment. Said vertical members may each have different thicknesses, colors, light transmission characteristics, light-emitting angles and distances from the object to be illuminated. The advantages and in particular the flexibility of this lighting technique can readily be appreciated.

The device shown comprises an upper cavity adapted to accommodate the object, when desired in at least partially recessed position and formed by the vertical, light-conductive wall members, including members 75, 76, 77 and 79, and by partition 74. The device comprises a lower cavity or light plenum chamber formed by partition 74, the vertical members, including light-impervious members 78 and 80 and by light-conductive members 75, 76, 77 and 79 shown. Surfaces 81, 82, 83 and 84 serve as optical interfaces.

If the device is rectangular, the vertical, light-conductive member or members used on each side of the rectangle may be different and are selected on the basis of the light effect to be achieved in order to display the object to best advantage. Said vertical, light-conductive means may consist of sheets, castings, extrusions or moldings provided with coatings or layers of substances on their vertical walls filtering or reflecting light back into such members. Depending on the effect to be achieved, some of the surfaces of said members may not be light impervious or may be provided with decorative patterns visible from the outside. The light-emitting surfaces 85, 86, 87 and 88 may be individually colored or may be provided with filters of different colors.

The linear configuration and cross-sectional profile of such means may be varied around the object for the purpose of providing predetermined amounts, angles, colors, and concentrations of light projected to a chosen part, facet, or surface portion of the object. As an example, the receptacle providing support for the object to be illuminated, such as a sculpture, may have an elongated, oval or rectangular shape and a light conductive member of conforming linear configuration. If the lighting of a particular part of the sculpture is to be accentuated in relation to other parts, the light-emitting surface of the conductive member facing the part of the sculpture to be highlighted can be caused to emit relatively more light than the light-emitting surfaces of other members. This can be done, for instance, by providing relatively larger light-emitting surfaces facing such selected parts and smaller light-emitting surfaces facing the other parts. Also, all or part of light-emitting surfaces facing those parts of the sculpture not intended to be strongly lighted may be masked off.

It will be obvious that many modifications and variations may be made in the illustrative device shown in FIG. 6 and these are intended to be within the scope of the claims, always provided that by placing the light source in close proximity to the object to be illuminated, the light path is reduced to the practical minimum described.

FIG. 7 is a partially broken away diagrammatic view of the claimed device intended primarily for multiple-effect lighting of sculptures and other objects having individual surfaces intended to be viewed in relief.

A light plenum chamber is formed by circular, vertical wall 100 and upper closure or horizontal wall 101. It may have a bottom closure or may rest on a supporting surface. Wall 101, which may also serve as a support for the object to be illuminated (not shown), may be transparent, or light-impervious or may block the passage of light only in predetermined areas. Light is generated by a central light source indicated by lamp 102. The central light source need not be confined to a single lamp, but may consist of a plurality of lamps in said light plenum chamber, always provided the light source is central and disposed in close proximity to the illuminated object.

Members 103, 104, 105, 106, 107 and 108 are acrylic plastic, light-conductive structures having, in the device illustrated, the shape of cylindrical rods near their lower ends. They either are in optical contact with transparent areas in wall 100, in which case light passes through said wall areas in contact with said light-conductive members. Alternatively, the lower ends of said light-conductive members pass through openings in wall 100, in which case the rest of wall 100 may be entirely opaque. Thus the shown lower end surfaces 109 and 110 of said members are optical interfaces through which light from said light source enters the rods.

As depicted in FIG. 7, the light-conductive vertically extending members differ in length and cross-section, depending on the shape of the object and on the areas of the object to be illuminated, the desired intensity, angle and focus of light. For instance, light-conductive member 103 has a circular light-emitting upper edge 111 facing downward towards the object (not shown). Member 104 is shorter and has an inward facing light-emitting edge 112. The light-emitting surface 113 of member 105 is rectangular and the light-emitting surface 114 of member 106 is oval-shaped. Surface 115 of member 107 is dome-shaped or hemispherical in order to disperse light, while surface 116 of member 108 is the termination of a tapered rod having converging sides concentrating the light rays directed at the object without scattering.

The variety of shapes, sizes, lengths and angles of the conductive members shown in FIG. 7 is not required in most instances and depicted only for illustrative purposes. It should be clear, however, that the arrangement of components permitted by the claimed device permits an array of lighting effects, which is extremely flexible and superior to other known devices. For instance, light of different colors or shades may be transmitted by the different light-conductive members, by either using colored light-conductive material in these members or interposing color filters at the light-entry or light-discharge end of the conductive members. The central light source also may comprise a plurality of lamps producing different colored lights used simultaneously or individually in sequence. If an upwardly directed light mantle is desired, light is introduced into wall 100 by any of the previously described methods. The upper edge 117 of transparent wall 100 is left exposed so as to project light upwardly in the direction of the object. The rest of the outer surface of wall 100 may be provided with an inwardly reflective coating. In that event, closure 101, which may serve as a support for the object to be illuminated fits on or within wall 100 and rests on set-backs, brackets or other conventional positioning means.

In another modification of the device, one or more of the vertically extending members may have a tubular or other hollow shape and a wall of sufficient thickness to transmit light. If, for instance, a curved acrylic cylinder is employed to pipe the light in the direction of a specific surface area of the object, an annular light beam will be projected from the emitting edge of such cylinder. Light may also be piped through the hollow interior of such tubular structure, the light rays being deflected by the inside surface of the acrylic cylinder. Molded acrylic members may be configured so as to produce any desired lighting effect in this manner.

The light conductive means may also comprise branches, protrusions and other configurations suitable to provide the desired amount, angle, concentration, distance and color desired to light individual portions of the object. It is one of the principal advantages of the present invention to be able to selectively and centripetally project light having the above enumerated, predetermined characteristics from selected positions in close proximity to three-dimensional objects. The central light source may comprise a plurality of lamps, each transmitting a light stream of selected characteristics through a light-conductive member.

This technique of controlling the illumination produces very subtle and distinctive effects, such as in the case of statues, sculptures or even plants having prominent parts or features towards which the attention of viewers is to be directed. When a device of the types described herein is permanently dedicated to one object, such as a museum piece, the said conductive members are specially designed or shaped to light each selected surface of the exhibit in the most appropriate manner. A plurality of different such members is provided to achieve the desired effect, requiring however only one central light source or lighting hub.

Figure 8:
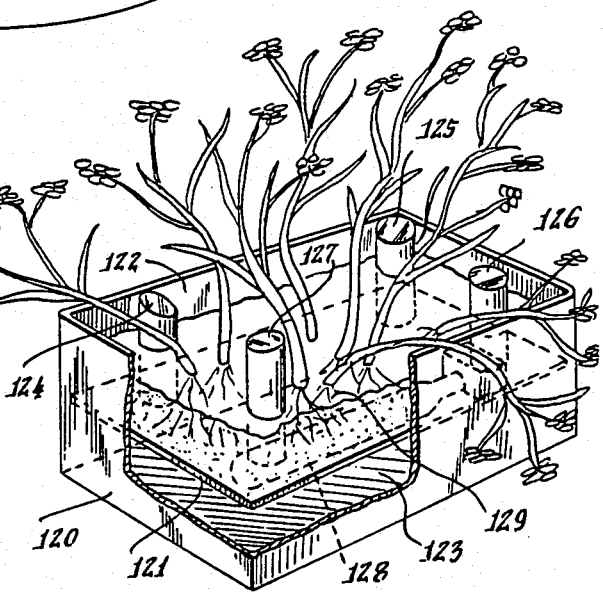
FIG. 8 is a partially broken away diagrammatic view in perspective of the system.

FIG. 8 is a partially broken away diagrammatic view of the apparatus and system used to illuminate plants. The planter shown comprises box 120 open at the top. Its walls may be transparent or opaque. Box 120 has a partition of false bottom 121 separating the box into upper cavity 122 and lower cavity 123 containing the light source. The false bottom 121 is sufficiently strong to act as a support for the plant, including its potting soil and other mechanical support. Thus, the upper cavity 122 of box 120 is a planter and lower cavity 123 is a light chamber.

Positioned close to the plant are light-conductive members 124, 125, 126 and 127, each having a lower light-receiving edge and an upper light-emitting edge. The upper light-emitting edges of said elongated members protrude above the level 129 of the soil and face the plant to be illuminated. Partition 121 may be transparent or opaque. It has openings in registry with the bottom edges of the light-conductive members, these openings being provided in said partition 121 in the desired locations, leaving space for the plant. Members 124, 125, 126 and 127 pass through and are cemented or glued to partition 121, so that their bottom surfaces act directly as light-receiving optical interfaces. Alternatively, if partition 121 is light-conductive, the bottom edges of members 124, 125, 126 and 127 may rest on the upper surface of partition 121 and receive light through it.

A light source 128 is provided in the lower cavity 123. Its light strikes the bottom surfaces of members 124, 125, 126 and 127 either directly or through said transparent partition. The light enters said light-conductive members through their lower surfaces and is conducted upwardly so as to issue from the upper surfaces of said members in the direction of the plant. Said members may be straight or curved. The method described has the advantage that light can be piped up by the device through the foliage to the blossoms of the plant which can thus be lighted from the inside of the foliage, creating highly attractive effects.

As described hereinabove, in devices incorporating the novel arrangement of the present invention, the light source is disposed in the device in recessed position in close proximity to the object to be illuminated. Obviously, the distance the light has to travel is to some extent affected by the height of the illuminated object. In any event, however, the combination of the above enumerated features reduces the path of the indirect light from the light source to the object to the practical minimum. This arrangement results in significantly reduced scattering and waste of light and in significantly reduced wattage requirements by focusing the light on the object to be illuminated from a close distance, which may be a few centimeters, in a highly efficient manner. It should be clear that any dispersion of light in the direction of the lighted object associated with some of the embodiments of the device, is intentional and not to be confused with the scattering of light between the light source and the object which is inherent in conventional methods.

This ability to direct low wattage light, for instance in the illumination of plants, primarily at the plant foliage from a close distance and through a plurality of light outlets without the distraction and discomfort of glare, permits a novel, attractive and much more economical lighting effect. For plants having a height of 30 centimeters and a diameteaer of 30 centimeters for instance, a 15 watt fluorescent lamp has proven entirely adequate. A 20 watt fluorescent lamp will provide ample light for a large plant 50 centimeters high and 40 centimeters in diameter. Particularly bushy plants, which ordinarily would require several spotlights positioned at different angles with attendant glare, can be lighted in a most attractive and glare-free manner by a single central light source arranged as hereinbefore described. If more powerful lamps are used, the light reflected by the illuminated object can even produce an intimate lighting effect throughout the ambient space without additional room lighting and without any glare.

The devices described herein, equipped with timers, may be used as night lights or to provide subdued illumination when this is desirable in homes and in public places.

In another embodiment of the invention, a light sensor is provided between the power source and the lamp, adapted to activate the light source at dusk and deactivate it at dawn. The device having an appropriate timer and a lamp aiding plant development, can provide such radiant energy to the plant at predetermined times in the absence of the occupants of the premises.

The embodiments of the invention described herein are intended to be illustrative of the principles of the invention and not limiting. Various modifications and other configurations and applications will occur to those skilled in the art. The scope of the present invention is indicated by the appended claims rather than by the foregoing description and all changes which come within the meaning and range of equivalency of the claims are intended to be embraced therein.

What is claimed is:

1. A system for illuminating plants comprising:
   a receptacle having vertical peripheral laterally light-impervious wall means adapted to support a plant therein forming an upper cavity and a lower cavity adapted to have an artificial light source therein,
   a partition separating said upper and lower cavities in said receptacle having transparent means permitting the vertical passage of light therethrough,
   at least one plant positioned in said upper cavity having substantially light impervious foliage which may include blossoms,
   a plurality of vertically elongated light-conductive members having upper and lower ends thereon, said lower ends being mounted in light-conducting relationship with said partition, said upper ends emitting light conducted through said elongated light-conductive members,
   an artificial light source mounted in said lower cavity in close proximity to said partition for directing light through said partition and said lower ends of said elongated light-conductive members,
   whereby the insides of the foliage and blossoms of plants arranged in said upper cavity of said receptacle are illuminated by light emitted by said upper ends of said light-conductive members.

2. The system as claimed in claim 1, wherein said vertical peripheral laterally light-impervious wall means forming said upper cavity is comprised of light-conductive material having a light-impervious means on a vertical surface thereof, having a light-receiving lower end and a light-emitting upper end, and wherein said partition and said lower cavity containing the light source extend horizontally below said wall means forming the upper light cavity, so as to cause light generated in the lower cavity to be conducted upwardly through said wall means towards the outer reaches of a plant positioned in said upper cavity.

3. The system as claimed in claim 1, wherein said upper cavity has plants supported therein by supporting means and wherein said light-conductive members extending upwardly from said partition protrude above said supporting means into the foliage of the plants, so as to illuminate inner portions thereof.

4. The system as claimed in claim 3, wherein said supporting means comprises potting soil.

5. The system of claim 1, wherein said light-conductive members have curved configurations.

6. The system of claim 1, wherein said light-conductive members have light-conducting branches for directing light at different areas of the plants positioned in said upper cavity.

7. The system as claimed in claim 1, wherein said light-conductive members comprise light conducting cylinders.

8. The system of claim 1, wherein said light-conductive members have outer surfaces covered by a light-reflecting means for reflecting light back into said members.

9. The system of claim 2, wherein said light-conductive wall means have outer surfaces covered by a light-reflecting means for reflecting light back into said wall means.

10. The system as claimed in claim 1, wherein selected surfaces of said light-conductive means are roughened for diffused light emission therefrom.

11. The system as claimed in claim 2, having light-shielding means on and sufficiently protruding above said vertical peripheral wall means of said upper cavity for substantially preventing the light-emitting surfaces of said light-conductive members from being visible to observers grouped around a plant positioned in said upper cavity.

12. The system as claimed in claim 2, wherein said light-conductive structures are comprised of acrylic plastic formulated to absorb ultraviolet radiation from fluorescent light sources.

13. The system as claimed in claim 3, wherein said light-conductive structures are comprised of acrylic plastic formulated to absorb ultraviolet radiation from fluorescent light sources.

14. The system as claimed in claim 2, wherein said light-conductive structures are individually configured to provide different light treatment to predetermined areas of the plant.

15. The system as claimed in claim 3, wherein said light-conductive structures are individually configured to provide different light treatment to predetermined areas of the plant.

16. An illuminating system for three-dimensional objects having inside surfaces, comprising:
    a receptacle having peripheral wall means,
    a partition having light-conductive portions, dividing said receptacle into an upper and a lower cavity,
    an object positioned in said upper cavity having substantially light-impervious, three-dimensional surfaces,
    support means for said object disposed above said partition,
    a light source mounted in said lower cavity, and
    a plurality of light-conductive members having lower ends in light-receiving relationship with said lower cavity and upper ends, said members protruding above said support means between said three-dimensional surfaces and having said upper ends projecting light from said light source against the inside surfaces of said object.

17. The system as claimed in claim 1 wherein at least one of said light-conductive members is adapted to emit light of a different color.

18. The system as claimed in claim 16 wherein at least one of said light-conductive members is adapted to emit light of a different color.

* * * * *